United States Patent [19]
Takechi et al.

[11] Patent Number: 6,016,967
[45] Date of Patent: Jan. 25, 2000

[54] AIR CONDITIONING APPARATUS FOR VEHICLE

[75] Inventors: Tetsuya Takechi; Koji Takahashi; Hideaki Inazawa; Yasuhiro Sato; Tatsuo Tsunooka, all of Kariya; Toshiaki Nomura, Chiryu, all of Japan

[73] Assignee: Denso Corporation, Kairya, Japan

[21] Appl. No.: 08/944,448

[22] Filed: Oct. 6, 1997

[30] Foreign Application Priority Data

| Oct. 7, 1996 | [JP] | Japan | 8-266375 |
| Dec. 17, 1996 | [JP] | Japan | 8-337242 |
| Jun. 6, 1997 | [JP] | Japan | 9-149417 |

[51] Int. Cl.⁷ ................................................ B60H 1/02
[52] U.S. Cl. ................................. 237/12.3 R; 237/8 A
[58] Field of Search ........................... 237/12.3 R, 8 C, 237/8 A, 8 R; 165/42, 43

[56] References Cited

U.S. PATENT DOCUMENTS 5,309,731  5/1994  Nonoyama et al. ............... 62/244

FOREIGN PATENT DOCUMENTS

| 61-263822 | 11/1986 | Japan | 237/12.3 A |
| 5-124426 | 5/1993 | Japan | |
| 6-255340 | 9/1994 | Japan | 237/2 B |

*Primary Examiner*—Henry Bennett
*Assistant Examiner*—Derek S. Boles
*Attorney, Agent, or Firm*—Harness, Dickey & Pierce, PLC

[57] ABSTRACT

According to the present invention, in an air conditioning apparatus setting a double laminar mode in which an inside air and an outside air are blown while being partitioned, when the maximum heating state is set during an air outlet mode in which air is blown out simultaneously from both of a foot opening portion toward feet of a passenger and a defroster opening portion toward a windshield, a passage for conditioned air is partitioned into a first air passage for the inside air and a second air passage for the outside air. The first air passage is communicated with the foot opening portion, and the second air passage is communicated with the defroster opening portion. In the double laminar mode, at an air downstream side of a heating heat exchanger, there is formed a communication path communicating between the first air passage and the second air passage, and an amount of the outside air at the side of the second air passage is set to be larger than that of the inside air at the side of the first air passage, so that the outside air in the second passage flows into the first air passage through the communication path. In this way, it is possible to improve a defrosting performance of the windshield.

21 Claims, 11 Drawing Sheets

AIR CONDITIONING APPARATUS FOR VEHICLE

CROSS-REFERENCE TO RELATED APPLICATIONS

This application is based on and claims priority of Japanese Patent Applications of Nos. Hei. 8-266375 filed on Oct. 7, 1996, Hei. 8-337242 filed on Dec. 17, 1996, and Hei. 9-149417 filed on Jun. 6, 1997, the contents of which are incorporated herein by reference.

BACKGROUND OF THE INVENTION

1. Field of the Invention:

This invention relates to an air conditioning apparatus, in which a passage in an air conditioning case is partitioned into a first air passage at a side of an inside air and a second air passage at a side of an outside air. A high-temperature inside air having been heated re-circulates and is blown out from a foot air outlet, and an outside air having a low-humidity is blown out from a defroster air outlet, to improve a heating capacity and to defrost a windshield.

2. Description of Related Art:

In a conventional air conditioning apparatus as disclosed in JP-A-5-124426, there are formed at one end side of an air conditioning case an inside-air inlet for introducing inside air and an outside-air inlet for introducing outside air and at the other end side of the air conditioning case a foot air outlet for blowing air toward a foot area, a defroster air outlet for blowing air toward an inner surface of a windshield, and a face air outlet for blowing air toward a face area.

In the air conditioning case, there is provided a partition plate for partitioning an interior of the air conditioning case into a first air passage extending from the outside-air suction port to the face air outlet and the foot air outlet and a second air passage extending from the outside-air suction port to the defroster air outlet.

Further, in each of the first and the second air passages, there are provided a heating heat exchanger, a bypass passage bypassing the heating heat exchanger, and an air mixing door. The air mixing door includes a door at a side of the first air passage, and another door at a side of the second air passage, which are integrally provided with a single rotary shaft rotatably disposed over both air passages.

When any one of the face mode, the bi-level mode, and the foot mode is selected as air outlet mode, if the inside air/outside air introduction mode is set to the inside-air circulation mode, the inside air is introduced into both air passages, whereas if the mode is set to the outside-air introduction mode, the outside air is introduced into both air passages.

Further, the foot/defroster mode is selected as the air outlet mode, there is set an inside air/outside air double laminar mode in which the inside air is introduced into the first air passage and the outside air is introduced into the second air passage. In this way, because a passenger compartment is heated by a recirculation of the inside air which has been already heated, the heating performance is improved. Further, because the outside air having a low humidity is blown toward the windshield, it is possible to obtain the defrosting performance of the windshield certainly.

When the foot/defroster mode is selected as the air outlet mode, generally, approximately 50% of air is blown out from the foot air outlet, and approximately 50% of air is blown out from the defroster air outlet. Further, when the foot mode is selected as the air outlet mode, generally, approximately 80% of air is blown out from the foot air outlet, and approximately 20% of air is blown out from the defroster air outlet.

Thus, between the foot/defroster mode and the foot mode, a ratio of amounts of the blown-air greatly varies. He inventors of the present invention have experimentally produced an air conditioning apparatus having a function of the above-described inside air/outside air double laminar mode, in which a communication path is formed at an air downstream side of a heating heat exchanger to communicate between the first air passage at a side of the inside air and the second air passage at a side of the outside air, and the ratio of amounts of the blown-air is varied by a variation of an amount of air passing through the communication path.

However, as a result of studies and examinations of the air conditioning apparatus having the communication path, which has been produced experimentally, the inside air in the first air passage is mixed into the outside air in the second air passage so that a defrosting performance of the windshield is deteriorated. As a result, the windshield may be frosted or clouded.

SUMMARY OF THE INVENTION

In view of the above-described problem, an object of the present invention is to improve the defrosting performance of the windshield, in the air conditioning apparatus for a vehicle, in which there is set a double laminar mode for partitioning an inside air and an outside air in an air conditioning case, and there is formed, at an air downstream side of a heating heat exchanger, a communication path for communicating between a first air passage at a side of the inside air during the double laminar mode where the inside air and the outside air are introduced into the first air passage and the second air passage, respectively.

According to the present invention, in an air outlet mode where both of a first opening portion for blowing air toward a lower portion of a passenger compartment and a second opening portion for blowing air toward an inner surface of a windshield are opened, when the maximum heating state is set, an air passage is partitioned into a first air passage through which an inside air flows and a second air passage through which an outside air flows, in such a manner that the first air passage is communicated with the first opening portion, the second air passage is communicated with the second opening portion. Further, a communication path is formed at an air downstream side of a heating heat exchanger to communicate between the first air passage and the second air passage in a double laminar mode where the first air passage and the second air passage are partitioned. In the double laminar mode, an amount of the outside air flowing through the second air passage is set to be larger than that of the inside air flowing through the first air passage in said double laminar mode, or a pressure in the communication path at a side of the second air passage is set to be larger than that at a side of the first air passage, so that the outside air in said second air passage is introduced into the first air passage through the communication path.

In this way, even if the communication path is formed to control a ratio of an air amount into the first opening portion and an air amount into the second opening portion, a flow of the outside air from the second air passage to the first air passage is generated. Therefore, the inside air can be suppressed from flowing into the second opening portion satisfactorily, and a defrosting performance of the windshield can be improved.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1:
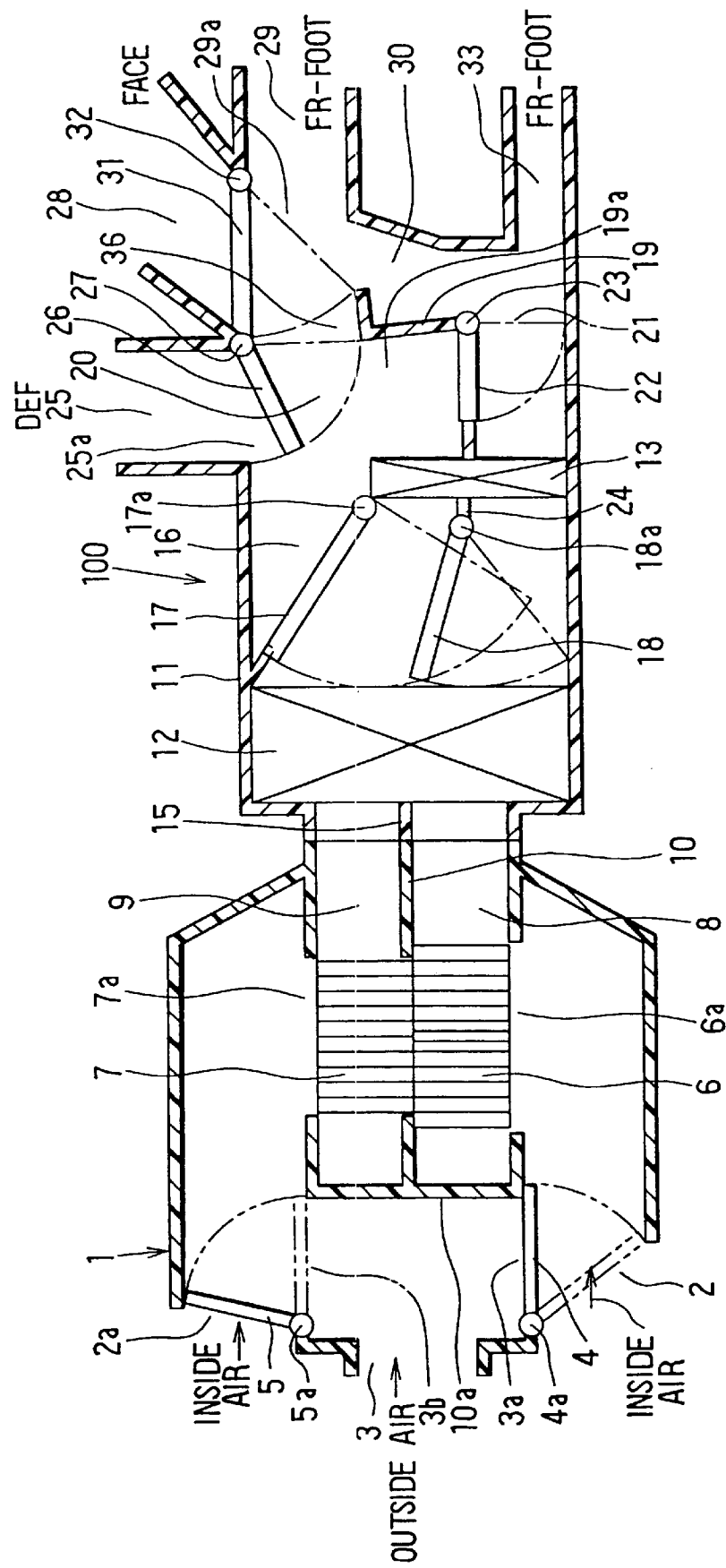
FIG. 1 is a view showing an entire construction of a ventilation system according to a first embodiment of the present invention.

Referring to the drawings, preferred embodiments of the present invention will be described.

A first embodiment of the present invention will be described with reference to FIGS. 1 and 2. In this embodiment, the present invention is applied to an air conditioning apparatus mounted on a vehicle in which it is difficult to secure a sufficient heat source for heating operation, such as a vehicle having a diesel engine mounted thereon, an electric vehicle, and a hybrid vehicle.

Figure 2:
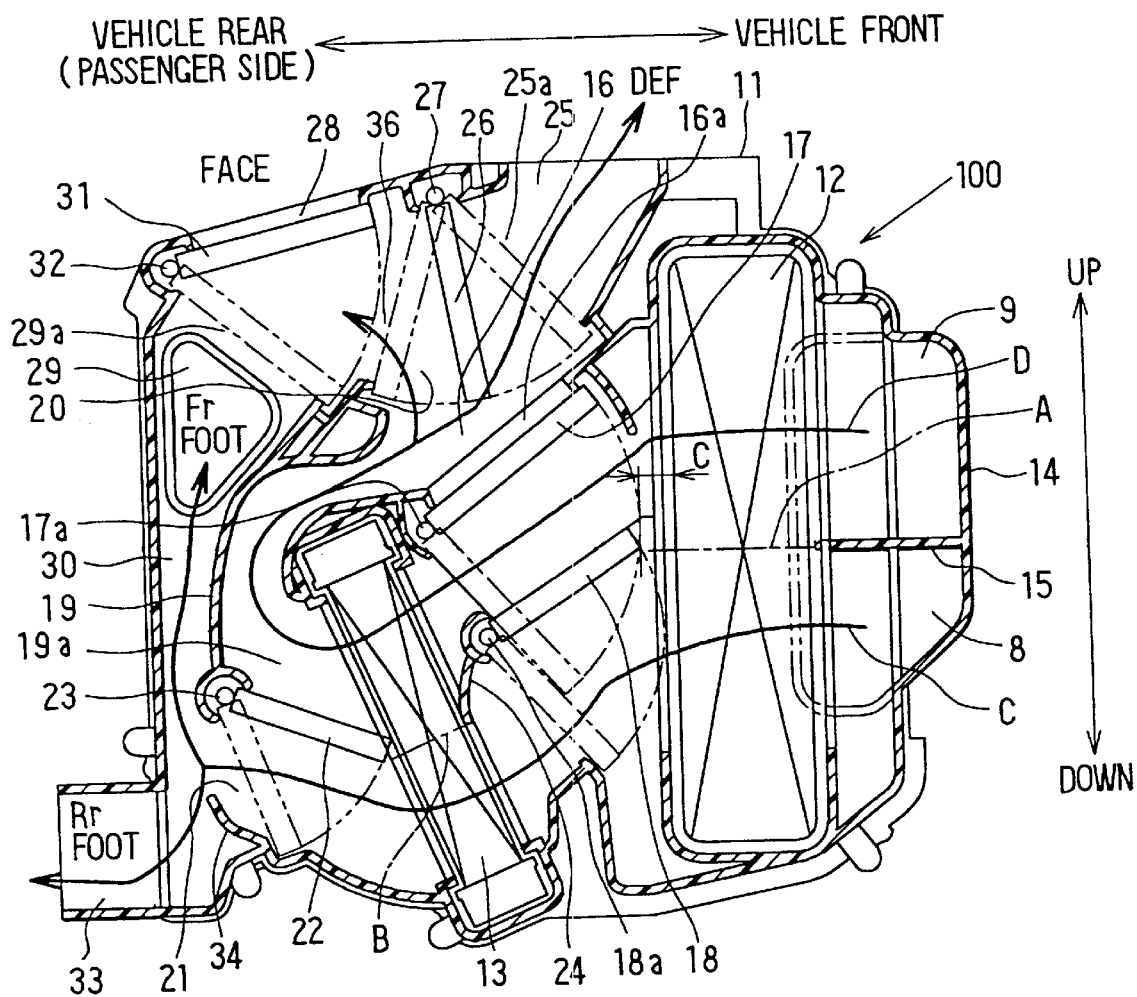
FIG. 2 is a cross sectional view of an air conditioning unit of FIG. 1.

FIG. 1 is a schematic view showing an entire construction of a ventilation system of an air conditioning apparatus, and FIG. 2 is a vertical cross section of an air-conditioning unit.

In FIG. 1, the ventilation system of the air conditioning apparatus is mainly divided into two parts of a blower unit 1 and an air conditioning unit 100. First, the blower unit 1 will be described. The blower unit 1 is disposed at a lower portion of a dashboard in a passenger compartment and at an offset position from a center portion toward a passenger's seat next to a driver's seat. The blower unit 1 is provided with a first and a second inside air introduction ports 2 and 2a for introducing an inside air (air in the passenger compartment) and an outside air introduction port 3 for introducing an outside air (air outside the passenger compartment). Those introduction ports 2, 2a and 3 are opened and closed by a first and a second inside air/outside air switching doors 4 and 5.

Those first and second inside air/outside air switching doors 4 and 5 are rotated with rotary shafts 4a and 5a, respectively, as a center thereof, and are operated by a link mechanism (not shown) and an actuator such as a servomotor in accordance with an inside air/outside air introduction mode control signal of the air conditioning apparatus.

In the blower unit 1, there are disposed a first (inside air) fan 6 and a second (outside air) fan 7 for blowing air introduced from the introduction ports 2, 2a, and 3. Both of fans 6 and 7 are composed of a centrifugal multi-blades fan (sirocco fan) and are rotated simultaneously by a single common electric motor (not shown).

FIG. 2 shows a state of a double laminar mode (described later). Because the first inside air/outside air switching door 4 opens the first inside air introduction port 2 and closes the outside air passage 3a from the outside air introduction port 3, the inside air is sucked into a suction port 6a of the first (inside air) fan 6. On the other hand, because the second inside air/outside air switching door 4 closes the second inside air introduction port 2a and opens the outside air passage 3b from the outside air introduction port 3, the outside air is sucked into a suction port 7a of the second (outside air) fan 7.

Therefore, in this state, the first fan 6 blows the inside air from the inside air introduction port 2 into a first (inside air) passage 8, and the second fan 7 blows the outside air from the outside air introduction port 3 into the second (outside air) passage 9. The first passage 8 and the second passage 9 are partitioned by a partition plate 10 disposed between the first fan 4 and the second fan 5. The partition plate 10 may be integrally formed with a scroll casing 10a made of resin, for accommodating both fans 6 and 7.

In this embodiment, to secure both of an improvement of the heating capacity and a defrosting performance of the windshield in the double laminar mode, an amount of the inside air blown by the first fan 6 in the double laminar mode is set to be larger than an amount of the outside air blown by the second fan 7 in the double laminar mode.

That is, considering an air flow resistance (pressure loss) in the first passage 8 and an air flow resistance (pressure loss) in the double laminar mode, a blowing capacity of the first fan 6 and a blowing capacity of the second fan 7 are set in such a manner that the amount of the inside air blown by the first fan 6 is set to be larger than the amount of the outside air blown by the second fan 7.

More specifically, a cross sectional area of the first passage 8 is set to be larger than that of the second passage 7 to reduce the air flow resistance (pressure loss) in the second passage 9 as compared with the first passage 8, a blowing capacity of the second fan 7 in a state of a single fan unit is set to be larger than that of the first fan 6, or a ratio of the amount of the inside air is set to be larger than that of the outside air in the double laminar mode by a combination of adjustments of the air flow resistance and the blowing capacity.

As a result of experiments and examinations by the inventors, it is preferable that a ratio of the amount of the inside air and the outside air is specifically set to approximately 4.5:5.5 to secure both of the heating performance and the defrosting performance of the windshield.

Next, the air conditioning unit 100 is of a type in which both of an evaporator (cooling heat exchanger) 12 and a heater core (heating heat exchanger) 13 are integrally accommodated in an air conditioning case 11. Hereinafter, a structure of the air conditioning unit 100 will be described specifically with reference to FIG. 2.

The air conditioning case 11 is made of resin which has an elasticity to some degree and is superior in a strength, such as ploypropylene, and is composed of right and left division cases each having an division surface in a vertical direction (up-and-down direction of the vehicle) in FIG. 2. The right and left division cases are integrally connected by fastening means such as a metal spring clip and a screw, after the heat exchangers 12 and 13, and components such as a door (described later) are accommodated therein, to construct the air conditioning case 11.

The air conditioning unit 100 is disposed at a lower side of the dashboard in the passenger compartment and substantially at a center portion in the right-and-left direction of the vehicle. In a portion of the air conditioning case 11, at the most front side of the vehicle, there is formed an air inlet 14 into which conditioned air blown by the blower unit 1 flows. The air inlet 14 is opened at a side surface of the passenger's seat to be connected to an air outlet portion of the blower unit 1 disposed in a portion at a front side of the passenger seat.

In the air conditioning case 11, there is disposed the evaporator 12 at a portion immediately after the air inlet 14 to cross whole areas of the first and second air passages 8 and 9. As being known well, the evaporator 12 is for cooling the conditioned air while absorbing an evaporation latent heat of a refrigerant of a refrigeration cycle from the conditioned air. As shown in FIG. 2, the evaporator 12 is thin in the front-and-rear direction of the vehicle and is disposed in the air conditioning case 11 in such a manner that a longitudinal direction thereof extends in the up-and-down direction of the vehicle.

An air passage extending from the air inlet 14 to the evaporator 12 is partitioned by a partition plate 15 into the first air passage 8 at a lower side of the vehicle and the second air passage 9 at an upper side of the vehicle. The partition plate 15 is integrally formed with the air conditioning case 11 by using resin and is a stationary partition member extending in a horizontal direction.

At an air downstream side (vehicle rear side) of the evaporator 12, there is adjacently disposed a heater core 13 to form a predetermined distance therebetween. The heater core 13 is for re-heating cool air having passed through the evaporator 7. In the heater core 13, high-temperature cooling water (hot water) for cooling an engine of the vehicle flows, and the heater core 13 heats the air by using the cooling water as heat source. Similar to the evaporator 12, the heater core 13 is thin in the front-and-rear direction of the vehicle and is disposed in the air conditioning case 11 in such a manner that a longitudinal direction thereof extends in the up-and-down direction of the vehicle. However, the heater core 13 is inclined from a vertical direction to the front side of the vehicle with a slight angle.

In the air conditioning case 11, there is formed a cool air bypass passage 16 at an upper portion of the heater core 13, through which the air (cool air) flows while bypassing the heater core 13.

In the air conditioning case 11, between the heater core 13 and the evaporator 12, there is provided a plate-like main air mixing door 17 and a plate-like auxiliary air mixing door 18 for adjusting an amount ratio of warm air to be heated in the heater core 13 and the cool air bypassing the heater core 13 (i.e., cool are flowing in the bypass passage 16). Both air mixing doors 17 and 18 are integrally connected to rotary shafts 17a and 18a, respectively, and are rotatable with the rotary shafts 17a and 18a in the up-and-down direction of the vehicle.

The rotary shafts 17a and 18a are rotatably supported in the air conditioning case 11, and each end portion of the rotary shafts 17a and 18a protrudes outside and is connected to a link mechanism (described later). Both air mixing doors 17 and 18 are interlockingly operated by the link mechanism and an actuator such as a servomotor in accordance with a blown-air temperature control signal of the air conditioning apparatus.

The rotary shaft 17a of the main air mixing door 17 is disposed at an upper side of the rotary shaft 18a of the auxiliary air mixing door 18 to form a predetermined distance therebetween, and both air mixing doors 17 and 18 are rotated to any rotational positions not to interfere with each other. In the maximum cooling operation, the air mixing doors 17 and 18 are rotated to positions where both are overlapped with each other, shown by a two-dot chain line in FIG. 2, in such a manner that both air mixing doors 17 and 18 are attached by pressure to a protrusion rib at a side of the air conditioning case 11 to fully close an air inflow passage into the heater core 13.

In the maximum heating operation, both air mixing doors 17 and 18 are rotated to positions shown by solid lines, and the main air mixing door 17 closes an inlet hole 16a of the cool air bypass passage 16. Simultaneously, a top end portion of the auxiliary air mixing door 18 is located at a position immediately after the evaporator 12 and in the vicinity of an extension line A of the partition plate 15 so that the auxiliary air mixing door 18 functions as a movable partition member for partitioning an air passage between the evaporator 12 and the heater core 13 into the first air passage 8 and the second air passage.

Especially, in this embodiment, the top end portion of the auxiliary air mixing door 18 is shifted from the extension line A of the partition plate 15 toward the second air passage 9 by a predetermined distance.

The evaporator 12 is of a laminated type in which a plurality of flat tubes, each of which is formed by connecting two metal thin plates made of aluminum or the like to each other, are laminated to sandwich a corrugated fin between the adjacent flat tubes, and then integrally brazed. In the evaporator 12, there is formed an air passage on the extension line A by a fin surface of the corrugated fin or a flat surface of the flat tube, so that the first air passage 8 and the second air passage are partitioned in the evaporator 12.

In the air conditioning case 11, there is provided, at an air downstream side (portion at the rear side of the vehicle), a partition wall 19 integrally with the air conditioning case 11 and extending in the up-and-down direction to form a predetermined distance with the heater core 13. By the partition wall 19, there is formed a warm air passage 19a extending upwardly from a position immediately after the heater core 13. At a downstream side (upper side) of the warm air passage joins to the cool air bypass passage 16 at an upper side of the heater core 13 to form a cool air/warm air mixing space 20 for mixing the cool air and the warm air.

At a lower end portion of the partition wall 19, there is opened a warm air bypass inlet portion 21 opposed to a surface at the air downstream side, of the heater core 13. The warm air bypass inlet portion 21 is opened and closed by a warm air bypass door 22. The warm air bypass door 22 is connected to a rotary shaft 23 rotatably disposed at an upper end portion of the warm air bypass inlet portion 21, and is rotated integrally with the rotary shaft 23 between a position shown by the solid line and a position shown by the two-dot chain line in FIG. 2.

In this embodiment, the warm air bypass door 22 is operated by a link mechanism (not shown) and an actuator (not shown) such as a servomotor in accordance with a blown-air temperature control signal and an air outlet mode control signal of the air conditioning apparatus.

In a foot air outlet mode (described later) and a foot/defroster outlet mode (described later), when the maximum heating operation (double laminar mode) is set, the warm air bypass door 22 is operated to a position shown by the solid line of FIG. 2 (position in the vicinity of a partition line B of the heater core 13) so that the warm air bypass door 22 functions as a movable partition member for partitioning the warm air passage 19a immediately after the heater core 13 into the first air passage 8 and the second air passage 9. A stop position of the warm air bypass door 22 is set such that a top end portion of the door 22 is shifted from the partition line B toward the second air passage 9 by a predetermined distance, similar to the auxiliary air mixing door 18.

The heater core 13 is of a type in which a plurality of flat tubes, each of which is formed by connecting metal thin plates made of aluminum or the like to have a flat cross section, to sandwich a corrugated fin between the adjacent flat tubes, and then integrally brazed. In the heater core 13, there is partitioned an air passage on the partition line B by a fin surface of the corrugated fin or a flat surface of the flat tube, so that the first air passage 8 and the second air passage are partitioned in the heater core 13.

At an air upstream side of the heater core 13, there is formed a stationary partition plate 24 integrally with the air conditioning case 11, for partitioning between the partition line B and the rotary shaft 18a of the auxiliary air mixing door 18.

In an upper surface portion of the air conditioning case 11, there is opened a defroster opening portion 25 at a portion of the vehicle front side. The conditioned air from the cool air/the warm air mixing space 20, a temperature of which has been controlled, flows into the defroster opening portion 25, and then is blown out toward an inner surface of the windshield of the vehicle, through a defroster duct (not shown) and a defroster air outlet (not shown). An inlet hole 25a provided in a passage leading to the defroster opening portion 25 is opened and closed by the defroster door 26. The defroster door 26 is rotatably disposed by a rotary shaft 27.

In the upper surface portion of the air conditioning case 11, there is opened a face opening portion 28 at a portion of the vehicle rear side (at a side of the passenger). The conditioned air from the cool air/the warm air mixing space 20, a temperature of which has been controlled, flows into the face opening portion 28 through a communication path 36, and then is blown out from a face air outlet at an upper portion of the dashboard, through a face duct (not shown).

At an upper portion of a side surface at the vehicle rear side, of the air conditioning case 11, there is opened a front-seat foot opening portion 29. The conditioned air from the cool air/the warm air mixing space 20, a temperature of which has been controlled, flows into the front-seat foot opening portion 29 through a communication path 36, and in the maximum heating operation, the warm air from the warm air bypass inlet portion 21 through an opening thereof flows into the front-seat foot opening portion 29 through the warm air passage 30. The warm air is blown out from the front-seat foot air outlet toward feet of the passenger at the front seat, through a front-seat foot duct (not shown).

Between an inlet hole 29a of the front-seat foot opening portion 29 and the face opening portion, there is disposed a foot/face switching door 31 rotatably supported by a rotary shaft 32. The inlet hole 29a of the front-seat foot opening portion 29 and the face opening portion 28 are selectively opened and closed by the door 31.

At a lower portion of a side surface at the vehicle rear side (at a side of the passenger), of the air conditioning case 11, there is opened a rear-seat foot opening portion 33 opposed to a position immediately after the warm air bypass inlet portion 21. The warm air from the warm air bypass inlet portion 21 and the warm air passage 30 flows into the rear-seat foot opening portion 33, and is blown out from a rear-seat foot air outlet (not shown) toward feet of the passenger at the rear seat, through a rear-seat foot duct (not shown).

Further, at a lower end portion of the warm air bypass inlet portion 21, there is provided a warm air guide plate for guiding the warm air toward the warm air passage 30.

In this embodiment, in the double laminar mode during the foot air outlet mode, at an air downstream side of the heater core 13, the warm air bypass door 22 is operated to a position shown by the solid line to partition the first and the second air passages 8 and 9 and to open the communication path 36. In this way, the first and the second air passages 8 and 9 are communicated with each other at a position in the vicinity of the front-seat foot opening portion 29.

The defroster door 26 and the foot/face switching door 31 are connected to a link mechanism (not shown) and are interlockingly operated by an actuator such as a servomotor in accordance with an air outlet mode control signal of the air conditioning apparatus.

Each of the above-described doors 4, 5, 17, 18, 22, 26, and 31 has the same structure in a state of the single unit, and has a door base plate made of resin or metal, which is integrally connected to the respective rotary shafts 4a, 5a, 17a, 18a, 23, 27, and 32 and is covered with elastic sealing materials at both sides.

In this embodiment, the warm air bypass door 22 and the foot/face switching door 31 construct foot-side door means.

Next, an operation of the embodiment having the above-described construction will be described.

The air conditioning apparatus is provided with an electronic control unit (not shown) to which an operation signal from each of various operation members and a sensor signal from each of various air conditioning sensors are input, and each position of the doors 4, 5, 17, 18, 22, 26, and 31 is controlled by output signals of the control unit.

Figure 3:
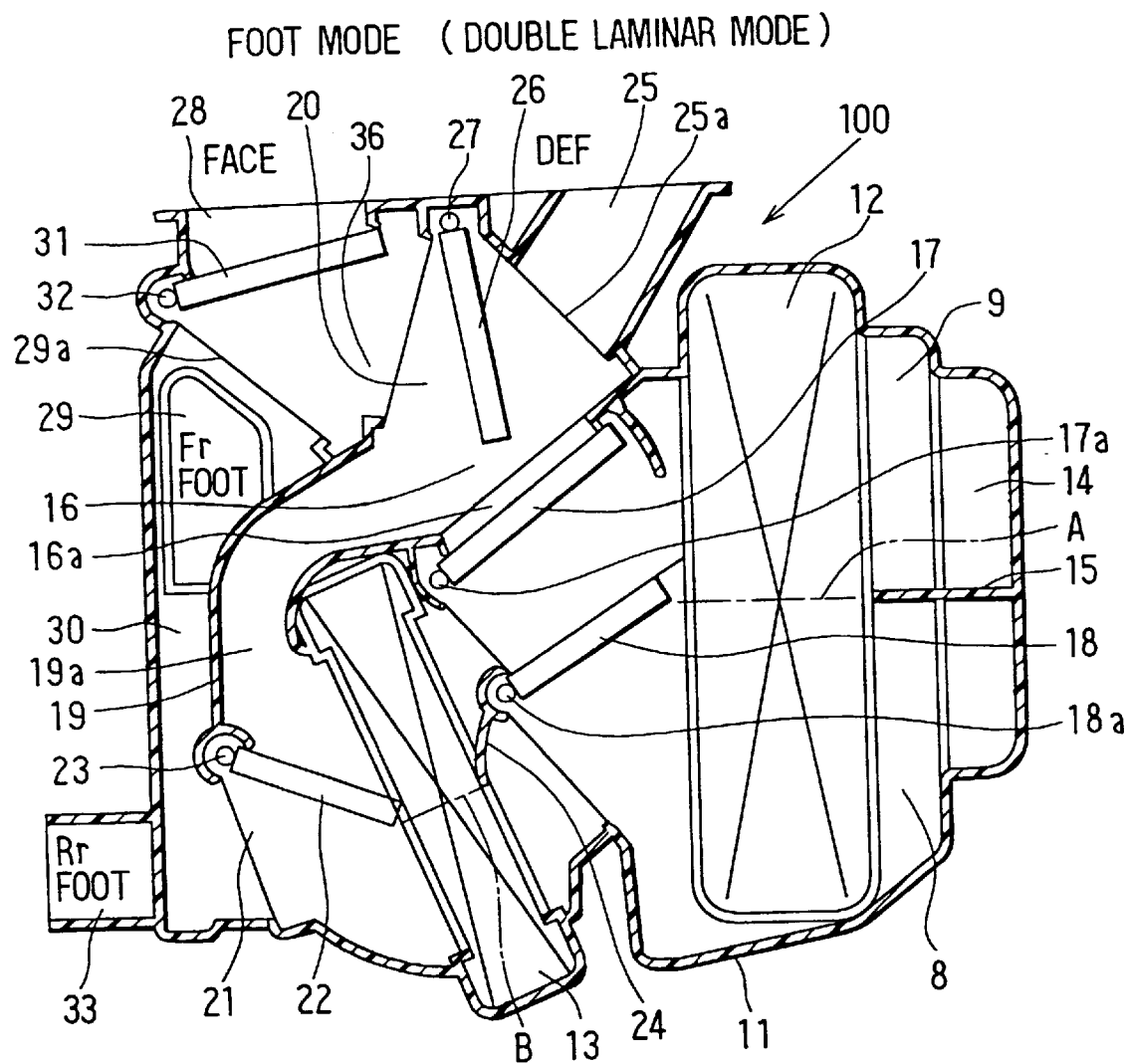
FIG. 3 is a cross sectional view showing a state of a double laminar mode in a foot air outlet mode according to the first embodiment.

FIGS. 1 to 3 show a state in which the double laminar mode is set when the maximum heating state is set in the foot air outlet mode. In this state, the first inside air introduction port 2 is communicated with the suction port 6a of the first (inside air) fan 6 and further the outside air introduction port 3 is communicated with the suction port 7a of the second (outside air) fan 7 in the blower unit 1. Therefore, in this state, the first fan 6 blows the inside air from the inside air introduction port 2 into the first (inside air) passage 8, and the second fan 7 blows the outside air from the outside air introduction port 3 into the second (outside air) passage 9.

Further, in the air conditioning unit 100, both air mixing doors 17 and 18 are rotated to the positions shown by the solid lines, so that the main air mixing door 17 fully closes the inlet port 16a of the cool air bypass passage 16, and simultaneously the top end portion of the auxiliary air mixing door 18 is located at a position immediately after the evaporator 12 and is shifted from the extension line A of the partition plate 15 toward the second air passage 9 by the predetermined distance. In this way, the auxiliary air mixing door 18 functions as the movable partition member for partitioning the air passage between the evaporator 12 and the heater core 13 into the first air passage 8 and the second air passage 9.

The warm air bypass door 22 is operated to the position shown by the solid line, so that the warm air bypass door 22 functions as the movable partition member for partitioning the warm air passage 19a immediately after the warm air passage 19a into the first air passage 8 and the second air passage 9 and opens the warm air bypass inlet portion 21.

The defroster door 26 is operated to an intermediate position between the communication path 36 and the inlet hole 25a of the defroster opening portion 25 to open both of the communication path 36 and the defroster opening portion 25. The foot/face switching door 31 closes the face opening portion 28 and opens the front-seat foot opening portion 29.

Therefore, by operating fans 6 and 7, the inside air from the inside air introduction port 2 and the outside air from the outside air introduction port 3 flow separately into the first air passage 8 and the second air passage 9, respectively, while being partitioned by the partition members 10, 15, 18, and 22. All of the inside air and the outside air passes through the heater core 13 and are heated maximally.

After being heated in the heater core 13, the inside air passes through the warm air bypass inlet portion 21 and the warm air passage 30 and leads to the front-seat and the rear-seat opening portions 29 and 33. On the other hand, after being heated in the heater core 13, the outside air passes through the warm air passage 19a at an upper side of the warm air bypass door 22, leads to the cool air/warm air mixing space 20, and further is divided into two flows therefrom. One of the outside air flows into the defroster opening portion 25, and the other outside air flows into the front-seat foot opening portion 29 through the communication path 36.

As a result, the warm air produced by heating the outside air having a low-humidity flows into the defroster opening portion 25, and the warm air having a low-humidity is blown out toward the inner surface of the windshield, so that the defrosting performance of the windshield can be secured sufficiently. Further, the high-temperature warm air produced by heating the inside air mainly is blown out into the front-seat and the rear-seat foot opening portions 29 and 33, so that the heating effect can be improved. In FIG. 2, an arrow C shows a flow of the inside air, whereas an arrow D shows a flow of the outside air.

At this time, a ratio of an amount of air blown into the defroster opening portion 25 and an amount of air blown into the foot opening portions 29 and 33 is controlled by operating the defroster door 26 into the intermediate position of the defroster door 26 to introduce the outside air in the second air passage 9 into the front-seat opening portion 29, so that the amount of the air blown into the foot opening portions 29 and 33 is set approximately 80% and the amount of the air blown into the defroster opening portions 25 is set approximately 20%.

Further, a noticeable point in the double laminar mode is that, although there is formed the communication path 36 communicating the first air passage 8 and the second air passage 9 at a downstream side of the heater core 13, the inside air is effectively prevented from flowing into the defroster opening portion 25.

That is, as described above, the ratio of the amount of the outside air is larger than that of the inside air (more specifically, there is set the ratio of approximately 4.5:5.5), further, the outside air is guided by the defroster door 26 to direct a dynamic pressure of the outside air having reached the position of the cool air/warm air mixing space 20 toward the communication path 36, and the air flow resistance in the front-seat and the rear-seat opening portions 29 and 33 is sufficiently smaller than that in the defroster opening portion 25. Therefore, the dynamic pressure of the inside air having reached the portion of the front-seat foot opening portion 29 is released into the front-seat foot opening portion 29 and lowers, and it is prevented that the inside air flows backward in the communication path 36 and is mixed into the outside air in the defroster opening portion 25.

Figure 4:
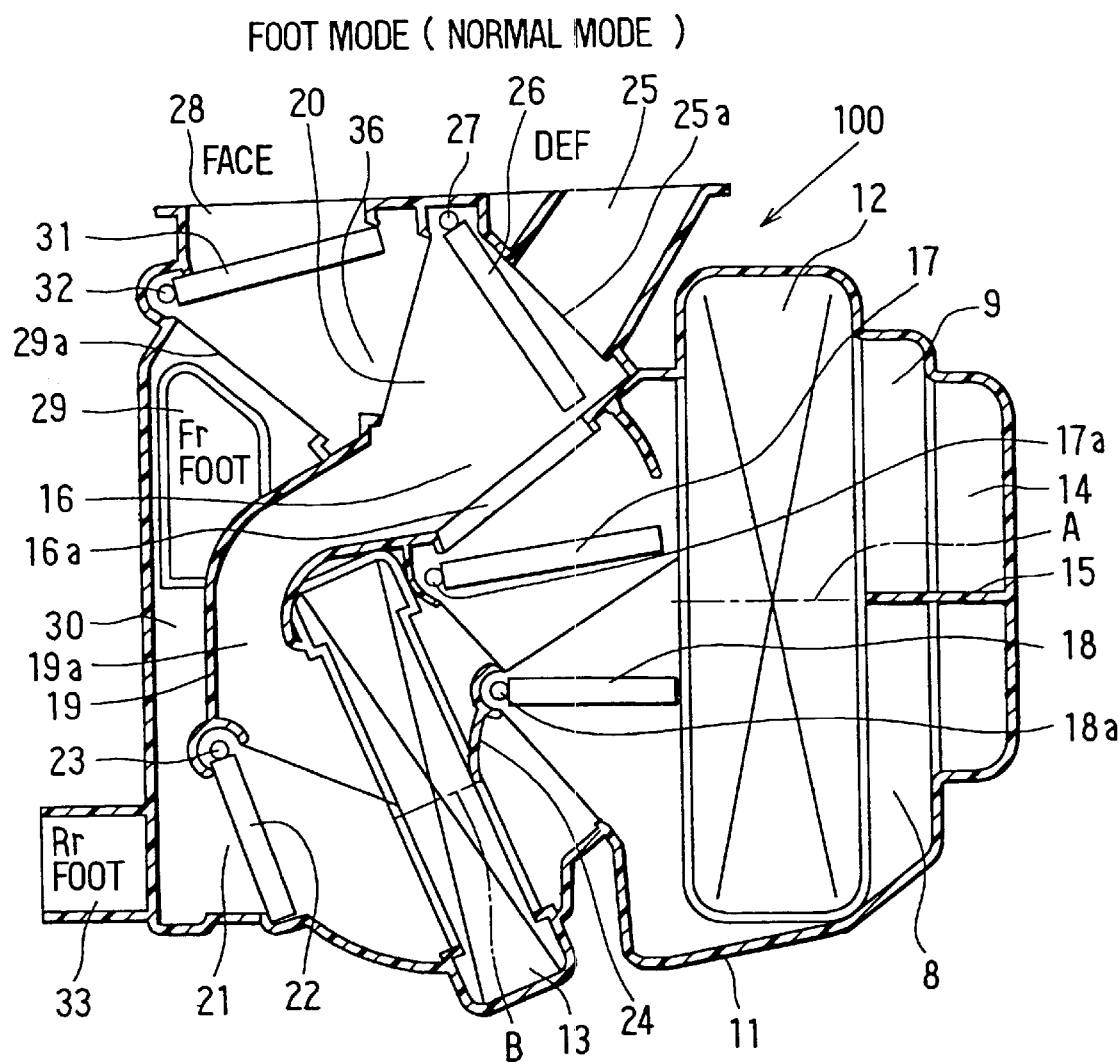
FIG. 4 is a cross sectional view showing a state of a normal mode in the foot air outlet mode according to the first embodiment.

Next, in the foot air outlet mode, when both mixing doors 17 and 18 are operated from the maximum heating state to an intermediate opening position to control a temperature of the blown-air, the air conditioning unit 100 becomes in a state of a normal mode as shown in FIG. 4. In this state of the normal mode, both air mixing doors 17 and 18 are operated to the intermediate opening position, and the main air mixing door 17 opens the cool air bypass passage 16. Therefore, the cool air passes through the cool air bypass passage 16 and flows directly into the cool air/warm air mixing space 20 while bypassing the heater core 13.

Interlocked with the operations of both air mixing doors 17 and 18, the warm air bypass door 22 is operated to the position shown by the solid line in FIG. 4, in which the warm air bypass inlet portion 21 is closed and the partitioning function for the warm air passage 19a immediately after the heater core 13 is eliminated.

Therefore, all of the warm air heated while passing through the heater core 13 rises in the warm air passage 19a and then is mixed with cool air from the cool air bypass passage 16 in the space 20, so that warm air having a desired temperature can be obtained. Most of the warm air passes through the communication path 36, leads toward the front-seat and the rear-seat foot opening portions 29 and 33, and is blown out toward feet of the passenger.

The remaining warm air in the space 20 leads toward the defroster opening portion 25 and is blown out toward the inner surface of the windshield.

In the foot air outlet mode having a temperature control area shown in FIG. 4, the maximum heating capacity is not necessary. Therefore, in the inside air/outside air introduction mode, generally, there is set a whole outside air mode in which both of the first and the second inside air introduction ports 2 and 2a are closed and only the outside air introduction port 3 is opened. However, by a manual operation of the passenger, there may be set a whole inside air mode in which the outside air introduction port 3 is closed and both of the first and the second inside air introduction ports 2 and 2a are opened, or an inside air/outside air mixture mode in which the inside air and the outside air are simultaneously introduced, as described above.

In the foot air outlet mode having this temperature control area, because the amount of the air blown toward the front-seat and the rear-seat foot opening portions 29 and 33 may lower by closing the warm air bypass inlet portion 21, the defroster door 26 is displaced from the position in FIG. 3 to the position in FIG. 4, in which an opening area of the communication path 36 is increased to prevent a decrease of the amount of the blown-air.

Figure 5:
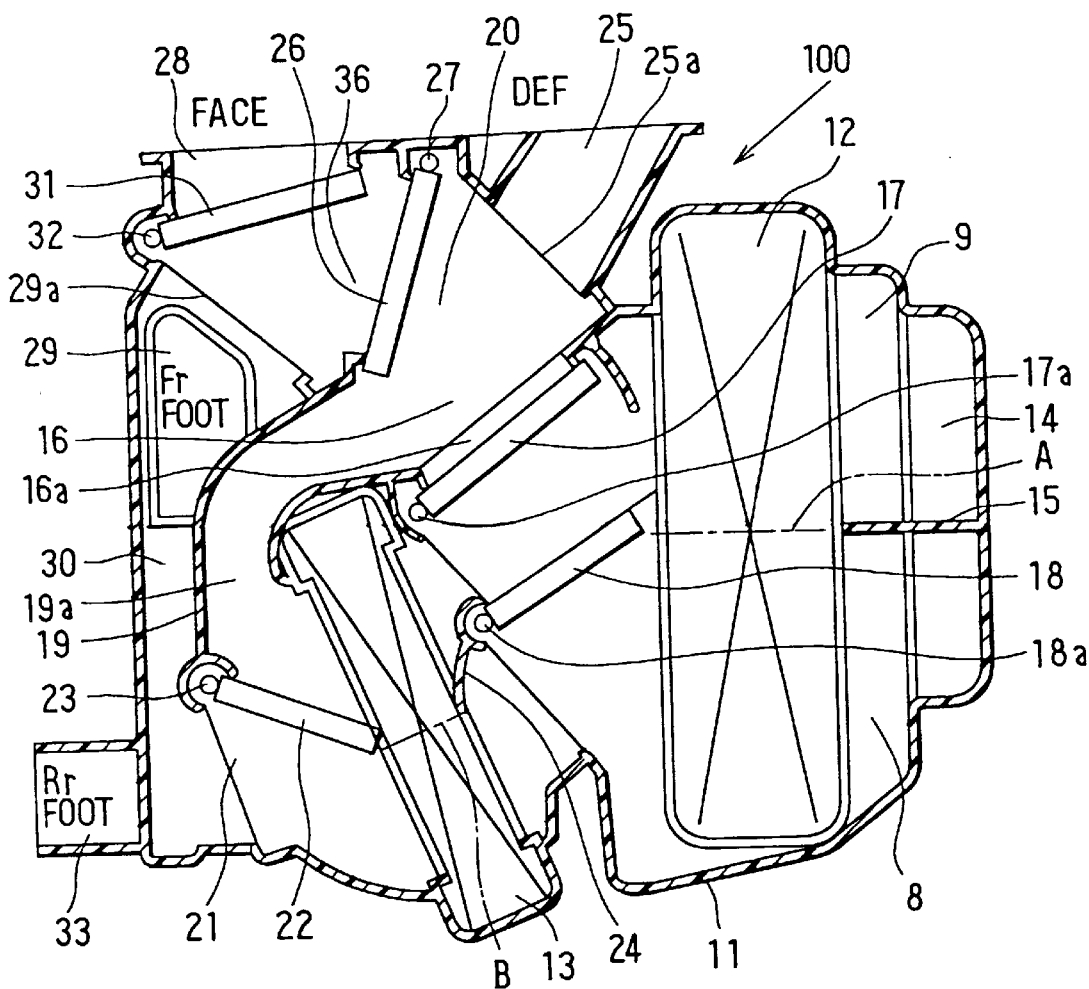
FIG. 5 is a cross sectional view showing a state of a double laminar mode in a foot/defroster air outlet mode according to the first embodiment.

Next, FIG. 5 shows a state in which the double laminar mode is set when the maximum heating state is set in the foot/defroster air outlet mode in which an amount of air blown from the front-seat and the rear-seat foot opening portions 29 and 33 is approximately equal to that from the defroster opening portion 25. In the double laminar mode during the foot/defroster air outlet mode, as being understood from a comparison with FIG. 3, the defroster door 26 is operated to a position to close the communication path 36.

In this way, because there is no flow of air flowing from the communication path 36 toward the front-seat foot opening portion 29, it is possible to set the amount of the air blown from the front-seat and the rear-seat opening portions 29 and 33 to be approximately equal to that from the defroster opening portion 25. The other points are similar to those in the double laminar mode in the foot air outlet mode.

Because air flow resistance of each portion in the air conditioning unit 100 varies for every product, the defroster door 26 may be operated to a position where the communication path 36 is opened slightly. In this way, in the double laminar mode, not only in the foot air outlet mode but also the foot defroster air outlet mode, the outside air from the second air passage 9 flows into the front-seat foot opening portion 29 through the communication path 36.

Figure 6:
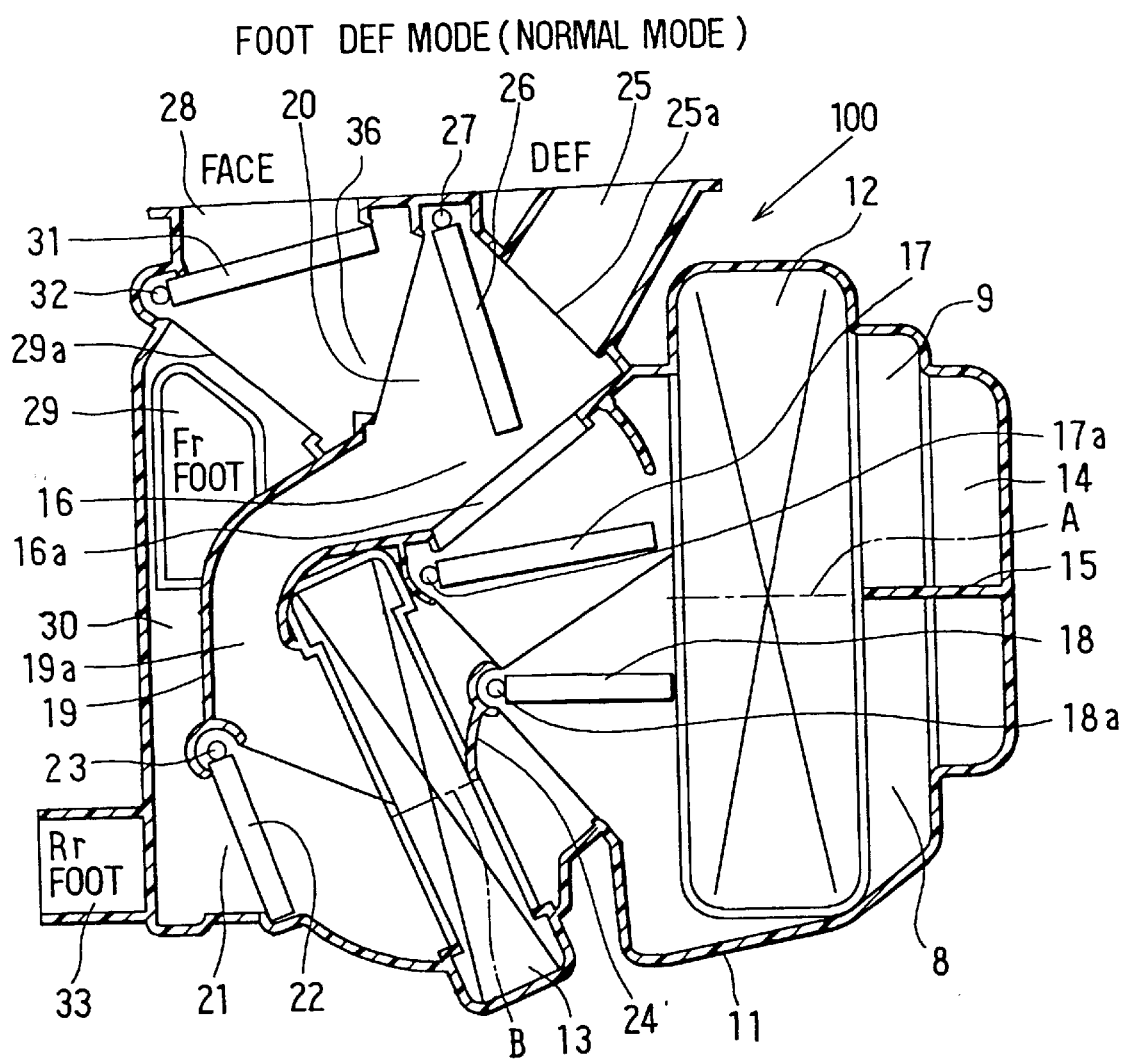
FIG. 6 is a cross sectional view showing a state of a normal mode in the foot/defroster air outlet mode according to the first embodiment.

Next, FIG. 6 shows a state of a normal mode when both mixing doors 17 and 18 are operated from the maximum heating state to an intermediate opening position in the foot/defroster air outlet mode, to control a temperature of the blown-air. In this state of the normal mode, interlocked with the operations of both air mixing doors 17 and 18, the warm air bypass door 22 is operated to the position shown by solid line in FIG. 6, to close the warm air bypass inlet portion 21. To secure an air flow passage toward the front-seat and the rear-seat foot opening portions 29 and 33, the defroster door 26 is operated to an intermediate position shown in FIG. 6 to maintain an air amount ratio in which an amount of the air blown toward the foot opening portions 29 and 33 is approximately equal to that toward the defroster opening portion 25.

Figure 7:
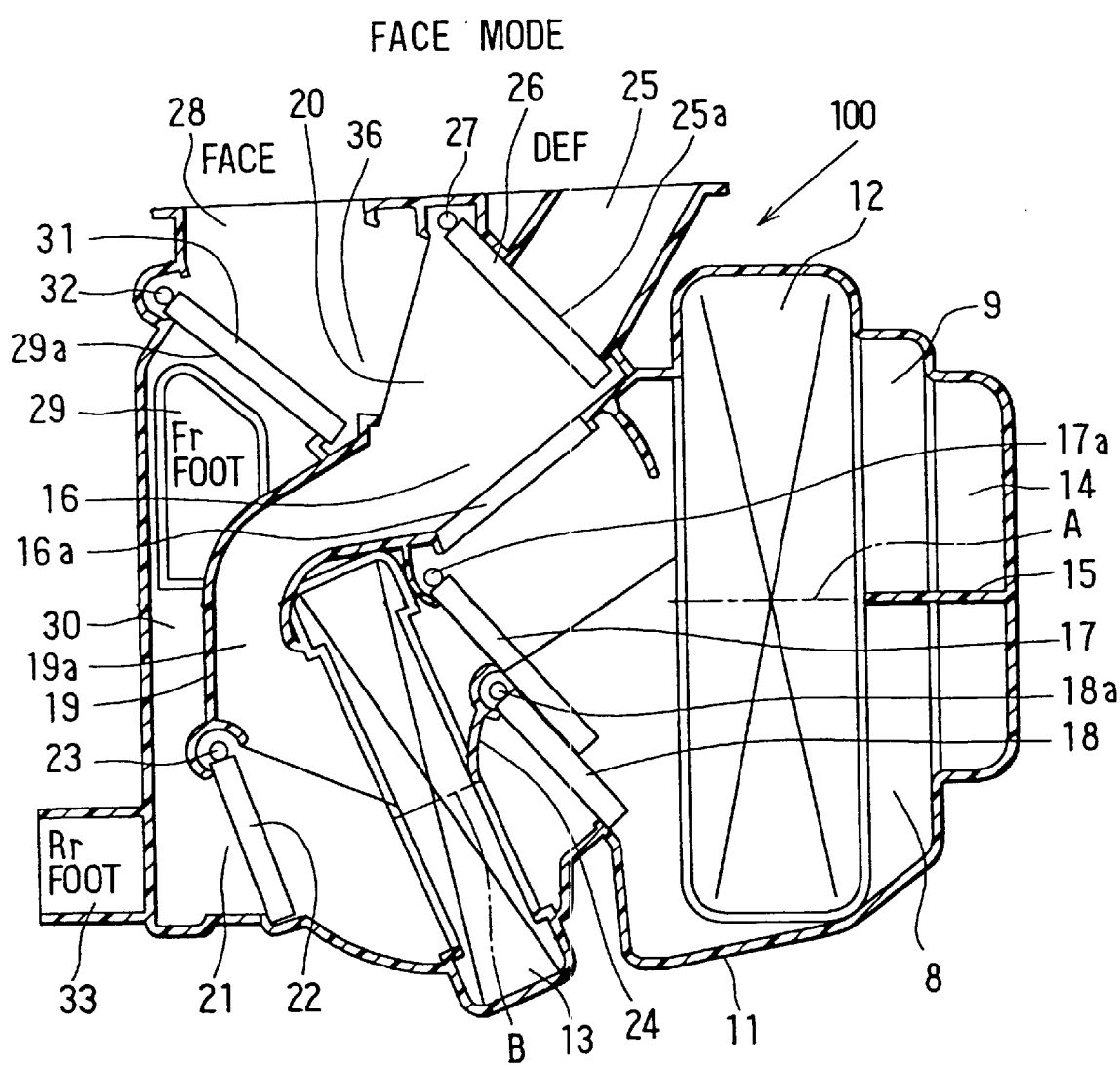
FIG. 7 is a cross sectional view showing a state of a face air outlet mode according to the first embodiment.

FIG. 7 shows a state of a face air outlet mode, in which the doors 22, 26 and 31 are operated to positions shown by the solid lines, respectively, to open only an air passage into the face opening portion 28. Both air mixing doors 17 and 18 are operated in the maximum cooling state to fully close an air inflow passage into the heater core 13. Therefore, all of cool air cooled in the evaporator 12 passes through the bypass passage 16 and is blown out toward the face opening portion 28.

By operating both air mixing doors 17 and 18 from the maximum cooling state toward the maximum heating operation, a temperature of the blown-air in the face air outlet mode can be adjusted freely.

Figure 8:
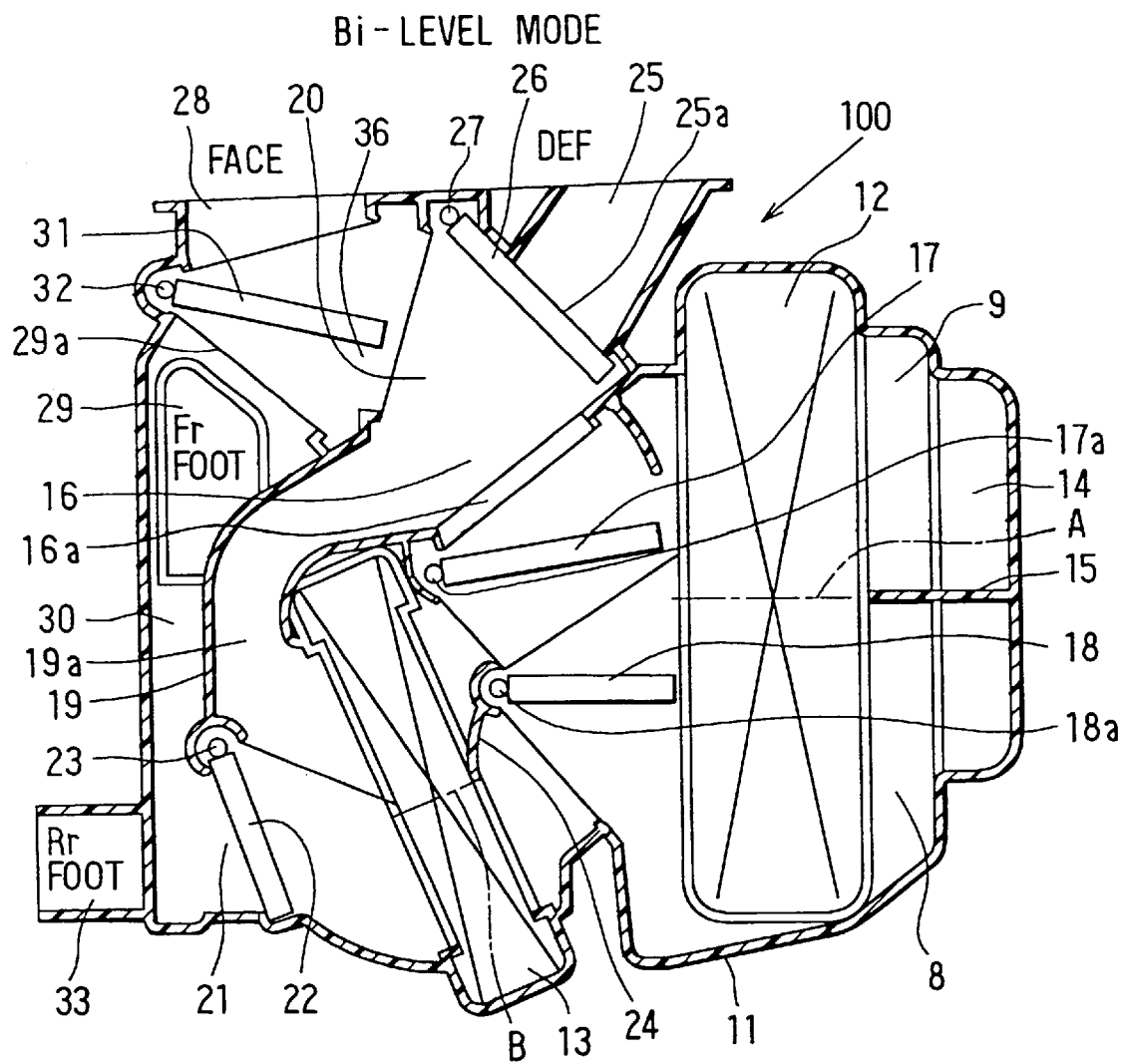
FIG. 8 is a cross sectional view showing a state of a bi-level air outlet mode according to the first embodiment.

FIG. 8 shows a state of a bi-level air outlet mode, in which the foot/face switching door 31 is operated from the position of the face air outlet mode to an intermediate position where an air passage toward the face opening portion 28 and an air passage toward the foot opening portions 29 and 33 are opened simultaneously. In this way, the cool air from the cool air bypass passage 16 is mainly blown toward the face opening portion 28, and the warm air from the warm air passage 19a is mainly blown into the foot opening portions 29 and 33. Therefore, the temperature of the air blown toward the face opening portion 28 is lower than that toward the foot opening portions 29 and 33, so that a temperature distribution of the blown-air, for cooling a head portion and heating a foot portion can be obtained.

Figure 9:
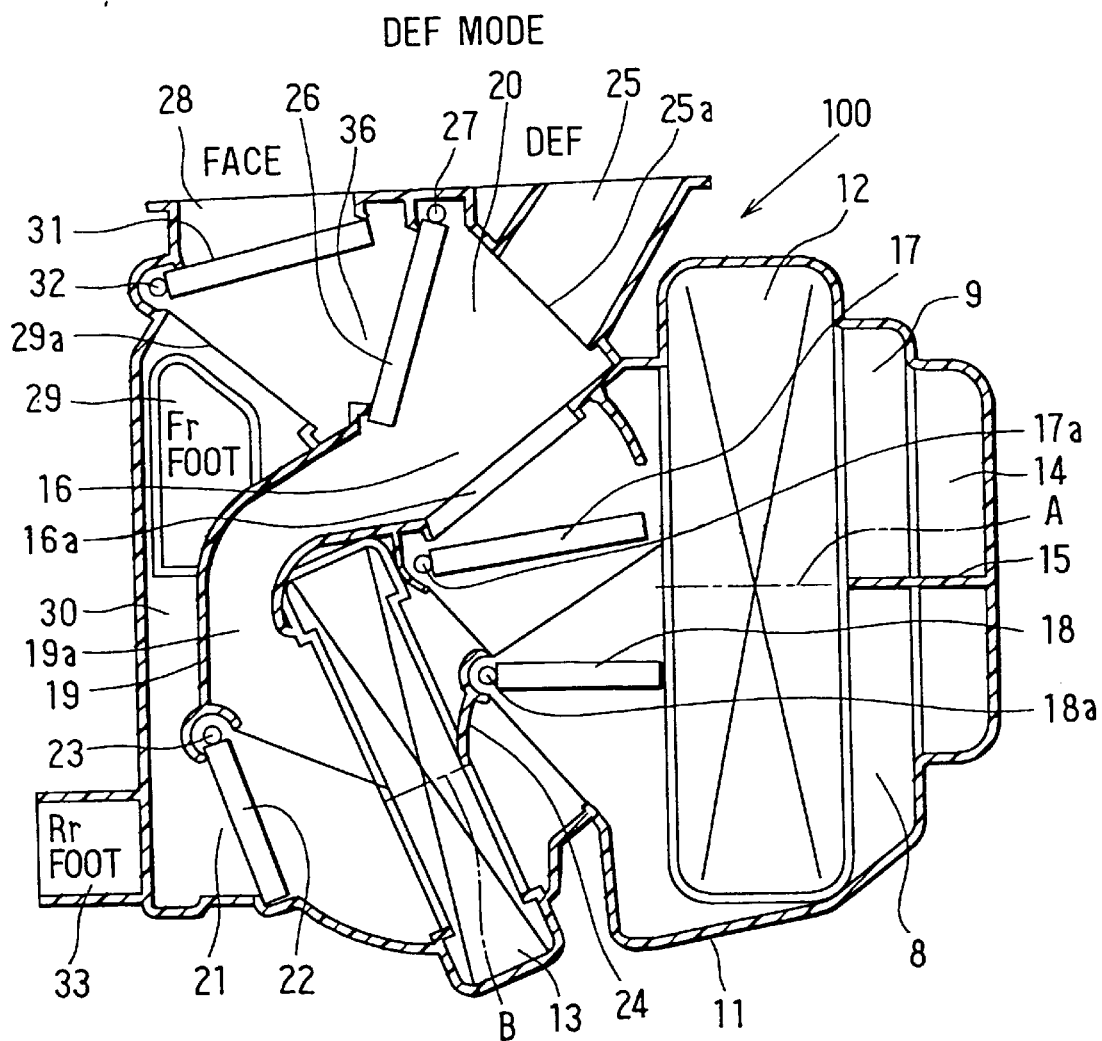
FIG. 9 is a cross sectional view showing a state of a defroster air outlet mode according to the first embodiment.

FIG. 9 shows a state of a defroster air outlet mode, in which the doors 22, 26 and 31 are operated to positions shown by the solid lines, respectively, to open only an air passage into the defroster opening portion 25. Both air mixing doors 17 and 18 are operated in the maximum heating state to fully close the cool air bypass passage 16; however, by rotating both air mixing doors 17 and 18 from the maximum heating state toward the maximum cooling operation, a temperature of the blown-air in the defroster air outlet mode can be adjusted freely. Further, in the defroster air outlet mode, even in the maximum heating state, the warm air bypass door 22 is operated to a position where the warm air bypass inlet portion 21 is closed, so that the warm air is prevented from flowing toward the warm air passage 30.

In the first embodiment, the maximum heating operation when the double laminar mode is set is not strictly limited to the case where the air mixing doors 17 and 18 are operated to the positions to completely prevent the cool air from bypassing; however, it may include a case where positions of the air mixing doors 17 and 18 allow a slight amount of the cool air to bypass.

Further, in the first embodiment, as temperature adjusting means for adjusting a heating amount of conditioned air in the heater core 13 to adjust a temperature of air, the air mixing doors 17 and 18 for adjusting an air amount ratio of cool air and warm air are employed; however, instead of the air mixing doors 17 and 18, by using a hot water valve for adjusting an amount of hot water flowing into the heater core 13 or a temperature of the hot water, the present invention can be also employed in an air conditioning apparatus in which a temperature of the air is adjusted by a function for adjusting the flow amount (or the temperature) of the hot water, of the hot water valve.

In the first embodiment, the warm air bypass door 22 is actuated by the actuating mechanism provided independently of the actuating mechanism (link mechanism and the actuating servomotor) of the air mixing doors 17 and 18; however, the warm air bypass door 22 may be actuated commonly by the actuating mechanism of the air mixing doors 17 and 18.

For example, the rotary shaft 23 of the warm air bypass door 22 is connected to an output shaft of the actuating servomotor of the air mixing doors 17 and 18 through a link mechanism. Further, in the other air outlet modes than the foot air outlet mode and the foot/defroster air outlet mode, e.g., in the defroster mode, even if both air mixing doors 17 and 18 are rotated to the maximum heating state, the warm air bypass door 22 is maintained at the closing position (shown by the two-dot chain line in FIG. 2) where the warm air bypass inlet portion 21 is closed, and only in the maximum heating operation in the foot air outlet mode and the foot/defroster air outlet mode, the warm air bypass door 22 is switched from the closing position to a partitioning position for partitioning between the first air passage 8 and the second air passage 9.

For this operation, in the maximum heating operation in the foot air outlet mode and in the foot/defroster air outlet mode, a rotational amount of the actuating servomotor of the air mixing door is increased as compared with the maximum heating operation in the other air outlet modes, and by the increase of the rotational amount of the servomotor, the warm air bypass door 22 may be switched from the closing position to the partitioning position between the first air passage 8 and the second air passage 9, while both air mixing doors 17 and 18 are maintained at the maximum heating state.

The present invention may be employed in an air conditioning apparatus in which the rear-seat opening portion 33 is eliminated from the first embodiment.

Further, in the first embodiment, the single warm air bypass door 22 has not only a function as the movable partition member in the double laminar mode but also a function for opening and closing the warm bypass inlet portion 21; however, according to a modification of the warm air passage 30 in the air conditioning unit, the warm air bypass door 22 may be divided into a door having a function as the movable partition member and a door for opening and closing the warm bypass inlet portion 21.

A second embodiment of the present invention will be described with reference to FIG. 10.

Figure 10:
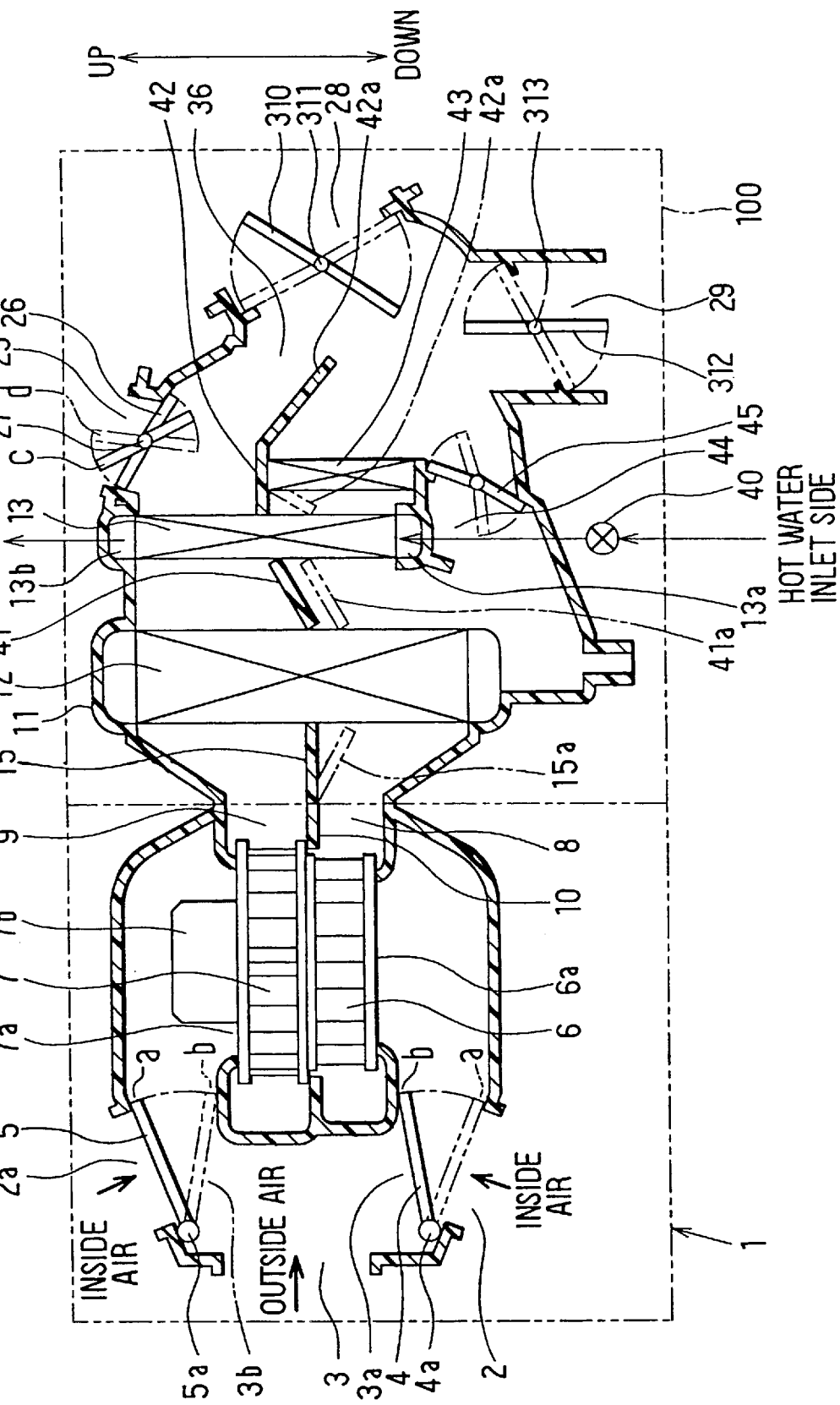
FIG. 10 is a schematic cross sectional view showing an entire construction of a ventilation system according to a second embodiment of the present invention.

In FIG. 10, parts and components similar or equivalent to those in the first embodiment are shown by the same reference numerals, and the explanation will be omitted. The blower unit 1 is substantially identical as in the first embodiment. An electric motor 7b is for rotating the first and the second fans 6 and 7. In the second embodiment, an outer diameter of the first fan 6 is small, and an outer diameter of the second fan 7 is large. This is because a decrease in an opening area of the suction port 7a due to an existence of the electric motor 7b is prevented.

In FIG. 2, for the convenience of drawing the figure, the blower unit 1 is disposed at the vehicle front side of the air conditioning unit 100; however, similar to the first embodiment, the blower unit 1 may be disposed at an offset position at a side of the air conditioning unit 100 in the passenger compartment. Further, there may be employed a layout that the air conditioning unit 100 is disposed in the passenger compartment, and the blower unit 1 is disposed in an engine compartment.

The air conditioning unit 100 is remarkably different from that in the first embodiment, and the different portions will be described hereinafter. First, as temperature adjusting means for adjusting a temperature of the blown-air, instead of the air mixing doors 17 and 18 for adjusting an air amount ratio of cool air and warm air, there is provided a hot water valve 40 for adjusting an amount (or a temperature) of hot water flowing into the heater core 13, and a temperature of the air is adjusted by a function for adjusting the flow amount (or the temperature) of the hot water, of the hot water valve 40.

The heater core 13 is of an one-direction flow type (multi-flow type) in which the hot water flows in one direction, from an inlet tank 13a at a lower side toward an outlet tank 13b at an upper side.

Since the air mixing doors 17 and 18 are eliminated as described above, in the air conditioning unit 100, there are provided partition plates 41 and 42, between the evaporator 12 and the heater core 13, and at an air downstream side of the heater core 13, respectively. The partition plates 41 and 42 are stationary partition members formed integrally with the air conditioning case 11, similar to the partition plate 15. Between the top end portion at the most air downstream side and the inlet portion of the face opening portion 28, there is formed the communication path 36 for always communicating between the first and the second air passages 8 and 9.

In the first air passage 8, at a portion immediately on an air downstream side of the heater core 13, there is provided an auxiliary electric heater 43. The auxiliary electric heater 43 is for heating the passenger compartment quickly when a temperature[of the hot water is low such as at a start of the engine, and is preferably constructed by an electric resistor (PTC heater) having positive resistance temperature characteristics in which a value of the resistance thereof increases suddenly at a predetermined temperature.

In this embodiment, because the auxiliary electric heater 43 is provided, the air flow resistance in the first air passage 8 increases, so that the air flow resistance in the first air passage 8 is larger than that in the second air passage in the double laminar mode.

In the first air passage 8 within the air conditioning case 11, at a lower side of the heater core 13, there is formed a cool air bypass passage 44 through which the air (cool air) flows while bypassing the heater core 13, and the cool air bypass passage 44 is opened by the cool air bypass door 45 in the maximum cooling operation.

In an upper surface portion of the air conditioning case 11, there is opened a defroster opening portion 25 directly communicated with the second air passage 9. The defroster opening portion 25 is opened and closed by the butterfly-shaped defroster door 26 rotatably supported by the rotary shaft 27.

At a portion of the most rear side of the vehicle (at a side of the passenger), there is opened the face opening portion 28 directly communicated with the first air passage 8. The face opening portion 28 is opened and closed by a face door 310, and the face door 310 is formed in a butterfly shape and is rotatably supported by a rotary shaft 311.

In a lower surface of the air conditioning case 11, at a portion at the vehicle rear side, there is opened the foot opening portion 2 directly communicated with the first air passage 8. The foot opening portion 29 is opened and closed by a foot door 312, and the foot door 312 is formed in a butterfly shape and is rotatably supported by a rotary shaft 313.

The defroster door 26, the face door 310, and the foot door 312 are connected to a link mechanism (not shown) and are interlockingly actuated by an actuator such as a servomotor in accordance with an air outlet mode control signal of the air conditioning apparatus.

The hot water valve 40 and the cool air bypass door 45 are connected to a link mechanism (not shown) and are interlockingly actuated by an actuator such as a servomotor in accordance with a temperature control signal of the air conditioning apparatus.

Next, an operation of this embodiment having the above-described construction will be described with reference to each of air outlet modes.

[FOOT AIR OUTLET MODE]

When the maximum heating state is set as at a start of a heating operation, the double laminar mode is set. In this case, the foot door 312 opens the foot opening portion 29, and the face door 310 closes the face opening portion 28. The defroster door 26 is operated to a small opening position "c" where the defroster opening portion 25 is slightly opened.

Further, because there is set the maximum heating state, the hot water valve 40 is fully opened so that the maximum amount of the hot water flows into the heater core 13, and the cool air bypass door 45 closes the cool air bypass passage 44.

On the other hand, in the blower unit 1, the first inside air/outside air switching door 4 is operated to a position "b" so that the first inside air/outside air introduction port 2 is opened and the outside air passage 3a of the outside air introduction port 3 is closed. Further, the second inside air/outside air switching door is operated to a position "a" so that the second inside air introduction port 2a is closed and the outside air passage 3a of the outside air introduction port 3 is opened.

In this way, the first fan 6 sucks the inside air from the first inside air introduction port 2, and simultaneously the second fan 7 sucks the outside air through the outside air passage 3a of the outside air introduction port 3.

The inside air blown by the first fan 6 flows through the first air passage 8 of the air conditioning unit 100, and the outside air blown by the second fan 7 flows through the second air passage 9 of the air conditioning unit 100.

Therefore, after passing through the evaporator 8 in the first air passage 8, the inside air is heated in the heater core 13 to be warm air, and is blown out through the foot opening portion 29 toward feet of the passenger in the passenger compartment. Simultaneously, after passing through the evaporator 12 in the second air passage 9, the outside air is heated in the heater core 13 to be warm air, and is blown out through the defroster opening portion 25 toward the inner surface of the windshield. In this way, it is possible to secure both of the improvement of the heating effect and the defrosting performance of the windshield.

Further, because the auxiliary electric heater 43 is provided in the first air passage 8, the air flow resistance in the first air passage 8 is larger than that in the second air passage in the double laminar mode. In addition, because the defroster door 26 is operated to the small opening position "c" where the defroster opening portion 25 is slightly opened, an internal pressure in the second air passage 9 is larger than that in the first air passage 8, in a portion at a downstream side of the auxiliary electric heater 43.

As a result, the warm air of the outside air in the second air passage 9 is mixed into the warm air of the inside air in the first air passage 8 through the communication path 36 so that the ratio (approximately 20%) of the amount of the air blown from the defroster opening portion 25 and the amount (approximately 80%) of the air blown from the foot opening portion 29 can be preferably set.

In addition, without providing the partition door for closing the communication path 36, the inside air in the first air passage 8 is prevented from being mixed into the defroster opening portion 25 through the communication path 36. Therefore, there is no possibility that the windshield is frosted or clouded by the inside air mixed into the defroster blown-air.

Next, when a temperature of the passenger compartment rises and a heating load lowers, the hot water valve 40 is operated from the full open position (the maximum heating state) to an intermediate opening position to control a temperature of the blown-air, and the amount of the hot water flowing into the heater core 13 is decreased.

In the intermediate temperature control area, the maximum heating capacity is not necessary. Therefore, the inside air/outside air introduction mode is generally set to the whole outside air mode in which both of the first and the second inside air introduction ports 2 and 2a are closed and both of the first and the second outside air passages 3a and 3b of the outside air introduction port 3 are opened. However, by a manual operation of the passenger, there may be set the whole inside air mode in which both of the first and the second outside air passages 3a and 3b of the outside air introduction port 3 are closed and both of the first and the second inside air introduction ports 2 and 2a are opened or the inside air/outside air double laminar mode in which the inside air and the outside air are simultaneously introduced as described above.

[FOOT/DEFROSTER AIR OUTLET MODE]

In the foot/defroster air outlet mode, to set the amount of the air blown from the foot opening portion 29 to be approximately equal to that from the defroster opening portion 25 (50% each), the defroster door 26 is operated to the position "d" to fully open the defroster opening portion 25.

In this way, because the amount of the warm air flowing toward the foot opening portion 29 through the communication path 36 is reduced, it is possible to set the amount of the air blown from the foot opening portion 29 to be approximately equal to that from the defroster opening portion 25.

In the maximum heating operation where the hot water valve 40 is fully opened, similar to the foot air outlet mode, the double laminar mode of the inside air and the outside air is set to secure both of the improvement of the heating effect and the defrosting performance of the windshield. Also in the foot/defroster air outlet mode, because the air flow resistances of the first and the second air passages 8 and 9 are set in such a manner that the warm air of the outside air in the first air passage 8 flows toward the foot opening portion 29 through the communication path 36, there is no possibility that the inside air is mixed into the defroster opening portion 25.

Further, after the opening degree of the hot water valve 40 is adjusted to an intermediate opening degree to shift the maximum heating state to the intermediate temperature control area, generally, the whole outside air mode is set; however, by a manual operation of the passenger, there may be set the whole inside air mode or the double laminar mode of the inside air and the outside air.

[FACE AIR OUTLET MODE]

In the face air outlet mode, the face door 310 fully opens the face opening portion 28, the defroster door 26 fully closes the defroster opening portion 25, and the foot door 312 fully closes the foot opening portion 29. Therefore, each of the first air and the second air passages 8 and 9 is communicated with only the face opening portion 28.

Accordingly, the cool air having been cooled in the evaporator 12 is re-heated by the heater core 13 so that the temperature of the air is controlled, and then all of the air is blown out toward the face opening portion 28.

At this time, any one of the whole inside air mode, the whole outside air mode, and the double laminar mode can be selected by the first and the second inside air/outside air switching doors 4 and 5.

In the maximum cooling state, the whole inside air suction mode is set. Further, the hot water valve 40 is fully closed to interrupt a circulation of the hot water into the heater core 13, and the cool air bypass door 45 opens the cool air bypass passage 44. Therefore, an amount of the cool air to be blown is increased, and the cooling capacity can be maximized.

[BI-LEVEL AIR OUTLET MODE]

In the bi-level air outlet mode, the face door 310 fully opens the face opening portion 28, and the foot door 312 fully opens the foot opening portion 29. The defroster door 26 fully closes the defroster opening portion 25. Therefore, the air can be simultaneously blown toward both of the upper side and the lower side of the passenger compartment 12 through the face opening portion 28 and the foot opening portion 29.

In the bi-level air outlet mode, the defroster opening portion 25 may be opened with a slight opening degree to blow a slight amount of the air toward the inner surface of the windshield, or one of the face opening portion 28 and the foot opening portion 29 is not fully opened but may be opened while being closed with a slight amount to adjust a ratio of the amount of the air to be blown toward the upper side and the amount of the air to be blown toward the lower side.

[DEFROSTER AIR OUTLET MODE]

In the defroster air outlet mode, the face door 310 fully closes the face opening portion 28, and the foot door 312 fully closes the foot opening portion 29. Further, the defroster door 26 fully opens the defroster opening portion 25. Therefore, all of the air form the first air passage 8 and the second air passages 9 are blown toward the inner surface of the windshield to defrost the windshield. At this time, the whole outside air suction mode is set to secure the defrosting performance of the windshield.

In the second embodiment, the auxiliary electric heater 43 is disposed in the first air passage 8 so that the air flow resistance in the first air passage 8 is larger than that in the second air passage 9; however, the auxiliary electric heater 43 is mainly mounted on a vehicle used for cold districts, and the auxiliary electric heater 43 may not be mounted. In such a case, for example, positions of the partition plates 15, 41, and 42 are shifted toward the first air passage 8 as shown by positions 15a, 41a, and 42a, of the one-dot chain lines in FIG. 10, respectively, to increase the air flow resistance in the first air passage 8, without employing the auxiliary electric heater 43.

Further, the opening degree of the defroster door 26 may be adjusted from the position "c" or "d" in FIG. 10 to the small opening degree so that an internal pressure of the second air passage 9 at a downstream side of the heater core 13 can be increased. Therefore, without employing the auxiliary electric heater 43, the internal pressure of the first air passage 8 at the downstream side of the heater core 13 is set to be higher than that of the second air passage 9.

Thus, the internal pressure of the first air passage 8 is set to be higher than that of the second air passage 9 by adjusting the positions of the partition plates 15, 41, and 42, or the opening degree position of the defroster door 26, so that the inside air can be prevented from being mixed toward the defroster opening portion 25 in the double laminar mode.

Further, to set the internal pressure in the communication path 36 at the side of the second air passage 9 to be higher than that at the side of the first air passage 8, according to the necessity, there may be combined two or three of the methods for providing the auxiliary electric heater 43 in the first air passage 8, shifting the positions of the partition plates 15, 41, and 42 toward the first air passage 8, and shifting the opening position of the defroster door 26 toward the small opening position.

According to the second embodiment shown in FIG. 10, the air guide plate 42a is integrally formed with the partition plate 42 disposed at an air downstream side of the heater core 13. The air guide plate 42a is for guiding downwardly a flow of the outside air in the communication path 36 at the side of the second air passage 9 toward the first air passage 8. More specifically, the guide plate 42a is disposed while being inclined to extend from a lower portion of the defroster opening portion 25 obliquely downwardly. In this way, the outside air at the side of the second air passage 9 flows downwardly along the inclination surface of the air guide plate 42a toward the first air passage 8.

Figure 11:
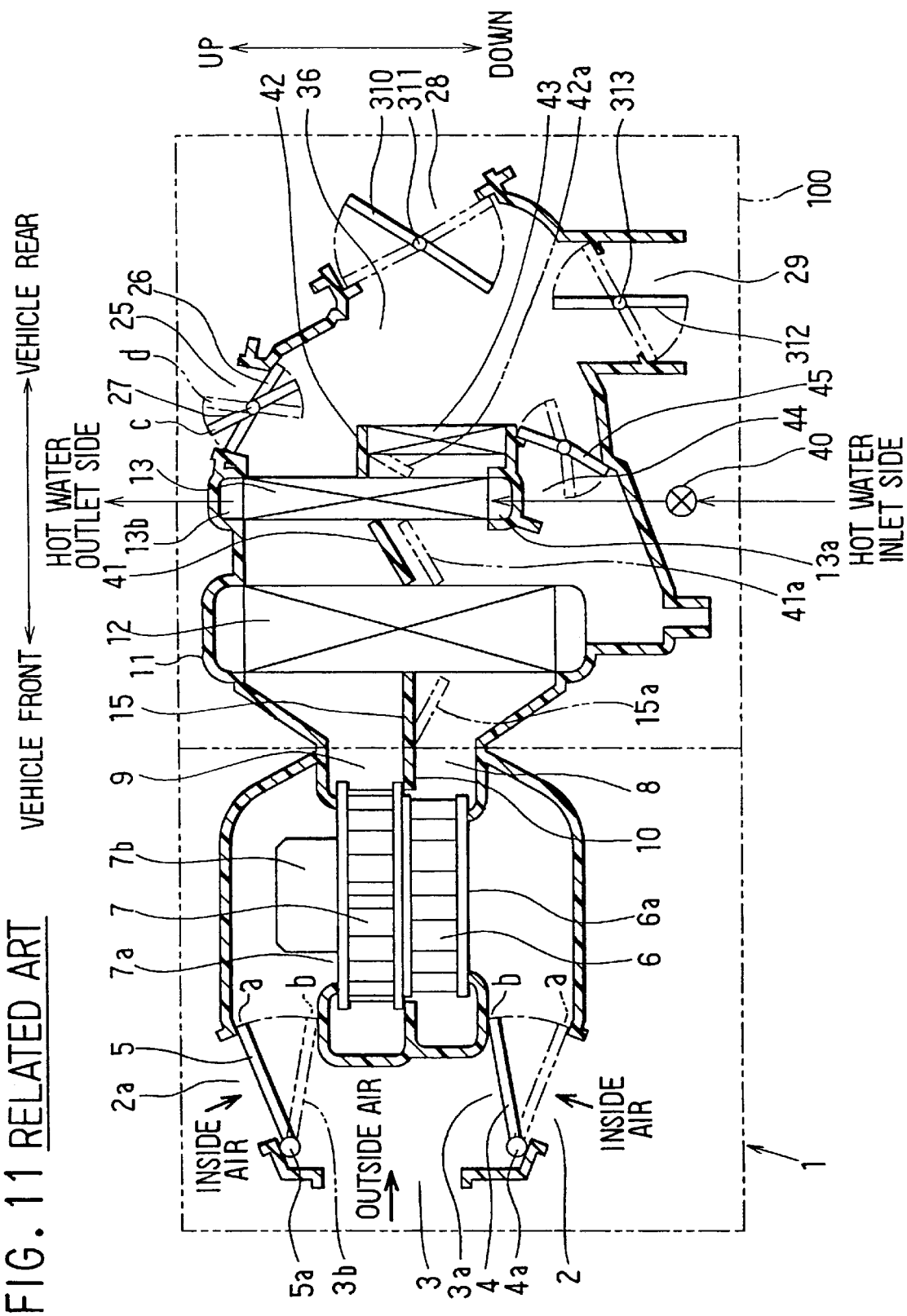
FIG. 11 is a schematic cross sectional view showing an entire construction of a ventilation system according to a comparison product.

In contrast, FIG. 11 shows a comparison product against the second embodiment. In this comparison product, a terminal end of the partition plate 42 positioned at an air downstream side of the heater core 13 is disposed at a portion of the auxiliary electric heater 43, and the air guide plate 42a of the second embodiment is eliminated.

As a result of studies and examinations by the inventors, according to the comparison product, there is no function for guiding the air flow at the side of the first air passage and the air flow at the side of the second air passage, at a position immediately after the auxiliary electric heater 43. Therefore, at the position immediately after the auxiliary electric heater 43, the inside air at the side of the first air passage 8 joins the outside air at the side of the second air passage 9. It turns out that, at the joining portion, there occurs a phenomenon in which a turbulence of the air flow, and the inside air is mixed into the outside air.

It also turns out that, the mixture phenomenon of the inside air at the side of the first air passage 8 and the outside air at the side of the second air passage 9 occurs to some degree, even if the internal pressure at the side of the second air passage 9 is higher than that at the side of the first air passage 8, so that the inside air having a high-humidity is mixed to deteriorate the defrosting performance.

For solving this problem, according to the second embodiment, the partition plate 42 is provided with the air guide plate 42a to guide downwardly the outside air in the communication path 36 at the side of the second air passage 9 to be directed toward the first air passage 8. In this way, it is further certainly prevented that the inside air having a high-humidity at the side of the first air passage 8 is mixed into the outside air at the side of the second air passage 9.

In the above-described embodiments, each of the doors 4, 5, 17, 18, 22, 26, 31, 36, 310, and 312 is operated by an actuator such as a servomotor through a link mechanism; however, each door may be manually operated by a manual operation member provided on an air conditioning operation panel, such as an inside air/outside air introduction setting lever, a temperature control lever, and an air outlet mode lever.

Further, the present invention may be employed in an air conditioning apparatus in which the evaporator (cooling heat exchanger) 12 is not disposed in the air conditioning unit 100.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioning apparatus for a vehicle having a passenger compartment, said air conditioning apparatus comprising:

an air conditioning case for forming an air passage, said air conditioning case having a first opening portion for blowing air toward a lower portion of the passenger compartment and a second opening portion for blowing air toward an inner surface of a windshield;

a heating heat exchanger for heating air passing through said air passage;

temperature control means for adjusting an heating amount by said heating heat exchanger to control a temperature of the air;

partitioning means for partitioning said air passage into a first air passage through which an inside air flows and a second air passage through which an outside air flows when said temperature control means is controlled to maximize the heating amount during an air outlet mode where both of said first opening portion and said second opening portion are opened, in such a manner that said first air passage is communicated with said first opening portion and said second air passage is communicated with said second opening portion;

a first fan for blowing an inside air into said first air passage;

a second fan for blowing an outside air into said second air passage;

means for forming a communication path at an air downstream side of said heating heat exchanger, for communicating between said first air passage and said second air passage in a double laminar mode where said first air passage and said second air passage are partitioned; and air amount control means for setting an amount of the outside air flowing through said second air passage to be larger than that of the inside air flowing through said first air passage in said double laminar mode, to introduce the outside air in said second air passage into said first air passage through said communication path.

2. An air conditioning apparatus according to claim 1, wherein air amount control means is constructed by that a blowing capacity of said second fan is larger than that of said first fan.

3. An air conditioning apparatus according to claim 1, wherein air amount control means is constructed by that an air flow resistance in said second passage is smaller than that of said first passage.

4. An air conditioning apparatus according to claim 3, further comprising:

an auxiliary electric heater disposed is said first air passage to set the air flow resistance in said second passage to be smaller than that of said first passage.

5. An air conditioning apparatus according to claim 1, wherein, said partitioning means includes a partition member disposed in said air conditioning case, for partitioning said first air passage and said second air passage, and said partition plate is provided, at an air downstream side of said heating heat exchanger, with an air guide plate for guiding the outside air in said second air passage into said first air passage through said communication path.

6. An air conditioning apparatus according to claim a 1, further comprising:

a first door for controlling an air flow into said first opening portion; and a second door for controlling an air flow into said second opening portion.

7. An air conditioning apparatus according to claim 6, wherein, in said double laminar mode, said first and said second doors are controlled to set a first air outlet mode where an amount of the air blown out from said first opening portion is substantially equal to that from said second opening portion, and said second door closes said communication path.

8. An air conditioning apparatus according to claim 6, wherein, in said double laminar mode, said first and said second doors are controlled to set a second air outlet mode where an amount of the air blown out from said first opening portion is larger than that from said second opening portion, and said second door opens said communication path.

9. An air conditioning apparatus according to claim 8, wherein, when said second air outlet mode is set in said double laminar mode, said second door guides a dynamic pressure of the outside air in said second air passage toward said communication path.

10. An air conditioning apparatus for a vehicle having a passenger compartment, said air conditioning apparatus comprising:

an air conditioning case for forming an air passage, said air conditioning case having a first air opening portion for blowing air toward a lower portion of the passenger compartment and a second opening portion for blowing air toward an inner surface of a windshield;

a heating heat exchanger for heating air passing through said air passage;

temperature control means for adjusting an heating amount by said heating heat exchanger to control a temperature of the air;

partitioning means for partitioning said air passage into a first air passage through which an inside air flows and a second air passage through which an outside air flows when said temperature control means is controlled to maximize the heating amount during an air outlet mode where both of said first opening portion and said second opening portion are opened, in such a manner that said first air passage is communicated with said first opening portion and said second air passage is communicated with said second opening portion;

a first fan for blowing an inside air into said first air passage;

a second fan for blowing an outside air into said second air passage;

means for forming a communication path at an air downstream side of said heating heat exchanger, for communicating between said first air passage and said second air passage in a double laminar mode where said first air passage and said second air passage are partitioned; and pressure setting means for setting a pressure in said communication path at a side of said second air passage to be larger than that at a side of said first air passage in said double laminar mode, to introduce the outside air in said second air passage into said first air passage through said communication path.

11. An air conditioning apparatus according to claim 10, wherein pressure setting means is constructed by that a blowing capacity of said second fan is larger than that of said first fan.

12. An air conditioning apparatus according to claim 10, wherein pressure setting means is constructed by that an air flow resistance in said second passage is smaller than that of said first passage.

13. An air conditioning apparatus according to claim 12, further comprising:

an auxiliary electric heater disposed is said first air passage to set the air flow resistance in said second passage to be smaller than that of said first passage.

14. An air conditioning apparatus according to claim 10, wherein, said partitioning means includes a partition member disposed in said air conditioning case, for partitioning said first air passage and said second air passage, and said partition plate is provided, at an air downstream side of said heating heat exchanger, with an air guide plate for guiding the outside air in said second air passage into said first air passage through said communication path.

15. An air conditioning apparatus according to claim 10, further comprising:

a first door for controlling an air flow into said first opening portion; and a second door for controlling an air flow into said second opening portion.

16. An air conditioning apparatus according to claim 15, wherein, in said double laminar mode, said first and said second doors are controlled to set a first air outlet mode where an amount of the air blown out from said first opening portion is substantially equal to that from said second opening portion, and said second door closes said communication path.

17. An air conditioning apparatus according to claim 15, wherein, in said double laminar mode, said first and said second doors are controlled to set a second air outlet mode where an amount of the air blown out from said first opening portion is larger than that from said second opening portion, and said second door opens said communication path.

18. An air conditioning apparatus according to claim 17, wherein, when said second air outlet mode is set in said double laminar mode, said second door guides a dynamic pressure of the outside air in said second air passage toward said communication path.

19. An air conditioning apparatus according to claim 10, wherein, said pressure setting means includes air amount control means for setting an amount of the outside air flowing through said second air passage to be larger than that of the inside air flowing through said first air passage in said double laminar mode, in such a manner that the pressure in said communication path at a side of said second air passage is larger than that at a side of said first air passage in said double laminar mode, to introduce the outside air in said second air passage into said first air passage through said communication path.

20. An air conditioning apparatus according to claim 6, wherein, in said double laminar mode, said first and said second doors are controlled to set a first air outlet mode and a second air outlet mode;

during said first air outlet mode, an amount of air blown out from said first opening portion is substantially equal to that from said second opening portion, and said second door closes said communication path; and during said second air outlet mode, the amount of air blown out from said first opening portion is larger than that from said second opening portion, and said second door opens said communication path.

21. An air conditioning apparatus according to claim 15, wherein, in said double laminar mode, said first and said second doors are controlled to set a first air outlet mode and a second air outlet mode;

during said first air outlet mode, an amount of air blown out from said first opening portion is substantially equal to that from said second opening portion, and said second door closes said communication path; and during said second air outlet mode, the amount of air blown out from said first opening portion is larger than that from said second opening portion, and said second door opens said communication path.

* * * * *